United States Patent [19]

Lyman

[11] 4,154,144
[45] May 15, 1979

[54] MILLING MACHINE POWER FEED

[76] Inventor: George F. Lyman, Lyman Designs, Box 152, Weston, Mass. 02193

[21] Appl. No.: 807,576

[22] Filed: Jun. 17, 1977

[51] Int. Cl.² ............................................. B23C 9/00
[52] U.S. Cl. .................... 409/162; 51/240 R; 74/354; 74/405; 409/324
[58] Field of Search ................... 90/21 R, 36; 51/231, 51/240 R; 74/354, 384, 405, 406, 527, 528, 532; 242/67.4; 292/210

[56] References Cited

U.S. PATENT DOCUMENTS

| 982,869 | 1/1911 | Pringle | 74/532 |
|---|---|---|---|
| 1,585,054 | 5/1926 | Taeger | 74/532 |
| 2,367,198 | 1/1945 | Cashon | 90/21 R |
| 2,583,385 | 1/1952 | Miller | 242/67.4 |
| 2,762,876 | 9/1956 | Glogau et al. | 74/528 |
| 3,021,719 | 2/1962 | Conrad, Jr. | 74/405 |
| 3,189,339 | 6/1965 | Siciliano | 74/528 X |
| 3,406,587 | 10/1968 | Brilando et al. | 74/527 |
| 3,490,335 | 1/1970 | King | 51/231 |
| 3,854,670 | 12/1974 | Bertolazzi | 74/354 |
| 3,919,894 | 11/1975 | Keeter et al. | 74/384 |

Primary Examiner—John Sipos
Attorney, Agent, or Firm—Wolf, Greenfield & Sacks

[57] ABSTRACT

Power feed apparatus adapted for driving the feed screw of a milling machine including a gear mounted on the end of the feed screw, a second gear driven by a reversible electric motor, an idler gear rotatably mounted on a lever for movement into and out of engagement between the first two gears, an adjustable pressure lock for retaining the lever in the position which keeps the idler gear engaged, and a housing mountable on the milling machine table supporting the motor, lever and pressure lock.

6 Claims, 8 Drawing Figures

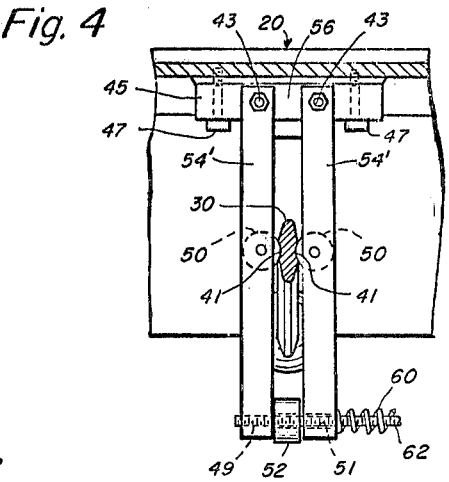
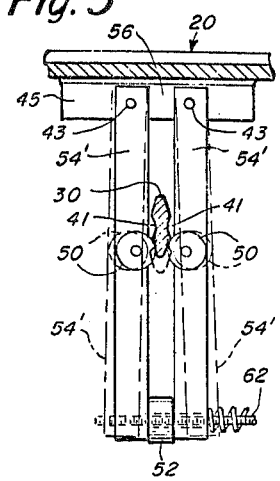
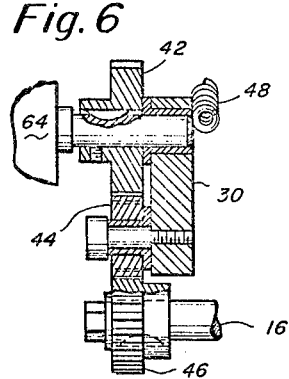
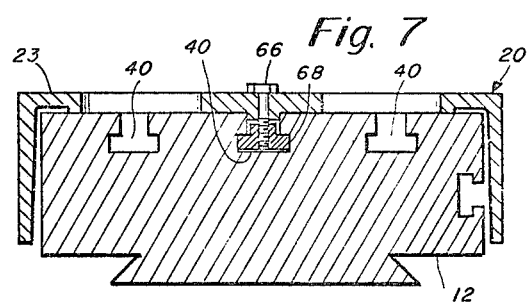
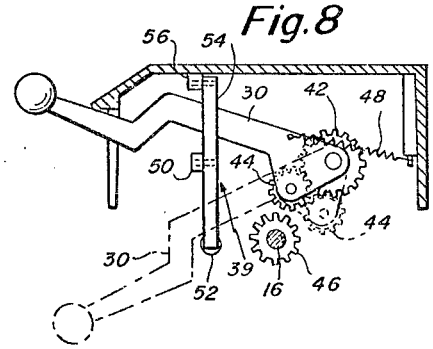

MILLING MACHINE POWER FEED

BACKGROUND OF THE INVENTION

The subject of the present invention is a power feed apparatus for milling machines, which when the power is engaged feeds material to be milled more evenly than is possible by hand and in which the power is disengaged automatically at the end of a cut, thereby obviating the necessity for constant supervision by the machine operator.

The conventional milling machine includes a stand, and a quill housing on the stand, containing a motor for a rotary cutting tool which projects downward toward a table. The table moves horizontally on the stand, by means of a feed screw, which engages the table and the stand. The feed screw is rotated by a hand crank handle at either end. Alternatively, the feed screw can be rotated by a power feed which incorporates a motor and replaces one of the crank handles. This has the advantage that the table and the material mounted on it for milling are moved under the cutting tool at a uniform rate, producing a smoother cut. The other crank handle remains available for manual operation of the feed screw.

Various power-feed devices, such as that disclosed in U.S. Pat. No. 3,490,335 (King) are available for attachment to milling machines, but most are either large and cumbersome or require manual disengagement at the end of every cut. For example, the King patent, supra, discloses power feed means having a motor, a motor output gear, a feed screw gear and an idler gear. The idler gear is movable by a lever or crank from a first position out of engagement with either of the other gears to a second position in engagement with both the motor output gear and the feed screw drive gear. It is retained in the latter position by an interlock through which the lever passes.

Milling machines are conventionally equipped with adjustable stops which, when screwed down tightly in a slot in the edge of a milling table, prevent the table from moving any farther under the influence of its feed screw and thereby stop a cut at the desired length. When the table reaches its stops, the feed screw is unable to rotate. If the feed screw is being driven by a power feed like that in the King patent, supra, when the feed screw and its drive gear stop rotating, so do the idler gear and the motor output gear which are in engagement with the drive gear. Since power is still being applied to the motor while its shaft is stopped, the motor will overheat and be damaged and/or blow its fuse unless the gears are manually disengaged. Thus, constant supervision by the machine operator is necessary.

Accordingly, it is a primary object of this invention to equip a power feed with means for automatically disengaging the motor gear from the feed screw drive gear whenever during the milling operation the table stop or any predetermined level of resistance is encountered.

It is a further object of this invention to provide a power feed which will feed at a constant rate and disengage itself repeatedly after exactly the same length of cut.

It is a further object of this invention to provide a power feed which will reverse direction with the flip of a toggle switch.

It is a further object of this invention to provide such an apparatus which is lightweight, which can be installed quickly and which does not interfere with manual operation.

FEATURES OF THE INVENTION

To accomplish these and other objects, the power feed of this invention has among its many features a housing for mounting on a milling machine table (which machine by itself forms no part of the present invention), a motor attached to the housing, an output gear driven by the motor, a drive gear attached to the milling machine's feed screw, a manually controlled idler gear which can be moved into or out of engagement with the feed screw drive gear, and an adjustable mechanism for keeping the idler gear in the engaged position.

A feed screw drive gear is mounted on the end of the milling machine's feed screw, and a lever supports the idler gear. The lever is mounted on a fixed pivot coaxial with the motor output gear, and it may be moved up or down from its middle position wherein the idler gear engages the feed screw so as to disengage the idler gear from the feed screw drive gear while maintaining engagement with the motor output gear. When the milling machine table reaches a stop, the feed screw drive gear stops rotating. The idler gear then climbs the motor output gear which is still turning, and it thereby disengages itself from the feed screw drive gear. The idler gear may be reengaged by manually moving the lever handle back to the middle position.

BRIEF FIGURE DESCRIPTION

Other objects, features and advantages will appear from the following description of a preferred embodiment of the invention as shown in the attached drawings in which:

FIG. 4 is a cross-sectional view of the adjustable lock mechanism for the lever, taken along section line 4—4 of FIG. 3.

FIG. 5 is the same view as in FIG. 4, with the idler gear lever in one of the disengaged positions.

FIG. 6 is a cross-sectional view of the gear train, taken along section line 6—6 of FIG. 3 showing the three idler gears in engagement.

FIG. 7 is a cross-sectional view taken along line 7—7 of FIG. 2, showing the power feed housing mounted on the milling machine.

FIG. 8 is a view similar to FIG. 3 but on a reduced scale, and showing the manner in which the idler gear may disengage the feed screw drive gear.

DETAILED DESCRIPTION OF THE DRAWINGS

Figure 1:
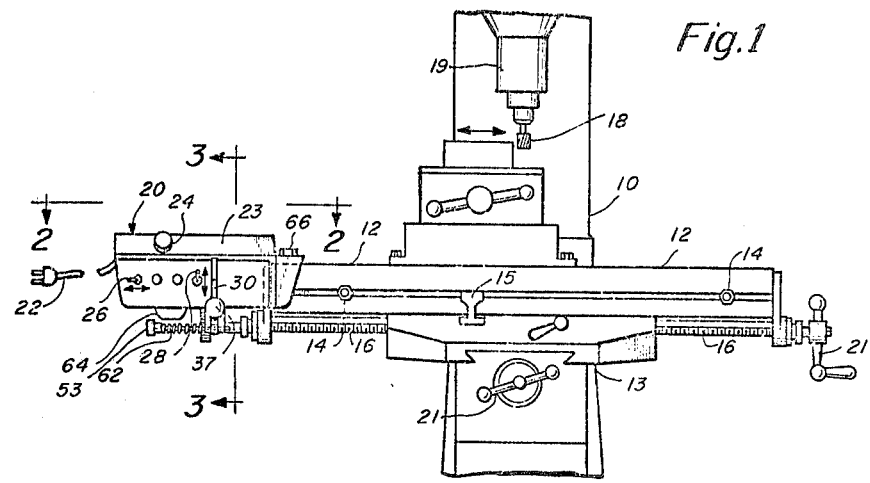
FIG. 1 is a front view of a milling machine with the power feed mounted on the left side thereof.

In FIG. 1 a milling machine 10 is shown having a movable table 12 carrying stops 14, and a feed screw 16. The feed screw engages teeth (not shown) within the milling machine stand 13 so as to cause the table to move when the feed screw rotates. The direction of movement of the table is dependant upon the direction of rotation of the feed screw. In use, the work piece is mounted on the table and moves with it beneath the rotary cutting tool 18 which is mounted on the head 19 of the milling machine for rotation about a fixed vertical axis. The feed screw 16 which moves the table so as to cause the work piece to pass across the cutting tool may be rotated by means of a hand crank 21 mounted on the right end of the table as viewed in FIG. 1 or alternatively the feed screw may be rotated by means of the power feed 20 mounted on the left end of the table and which comprises this invention. The table may be moved horizontally perpendicular to the direction of the feed screw by means of the cross feed crank handle 21' that is carried by a cross feed screw (not shown).

Figure 2:
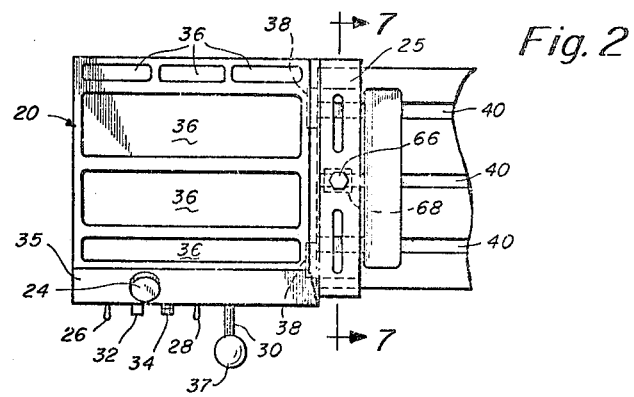
FIG. 2 is a top view of the apparatus, mounted on the left end of a milling machine table.

The power feed 20 of this invention is shown in FIGS. 1-3 and 7 mounted on the left end of the table. The power feed includes a housing 23 within which the various parts of the feed are assembled, and the housing is mounted on the left end of the table by means of bolt 66 which extends through bracket 25 forming an integral part of the housing on its right end as shown in FIGS. 1 and 2. Bolt 66 extends through the brackets 25 into the center T-slot 40 formed in table 12 where it screws into nut 68 held in the slot by means of the slot undercut. A pair of stops 38 are formed in housing 23 to orient the housing properly with respect to the end of the table when the power feed is mounted in place. The housing includes a number of recesses 36 in its top surface that serve as trays for holding tools or other devices.

Figure 3:
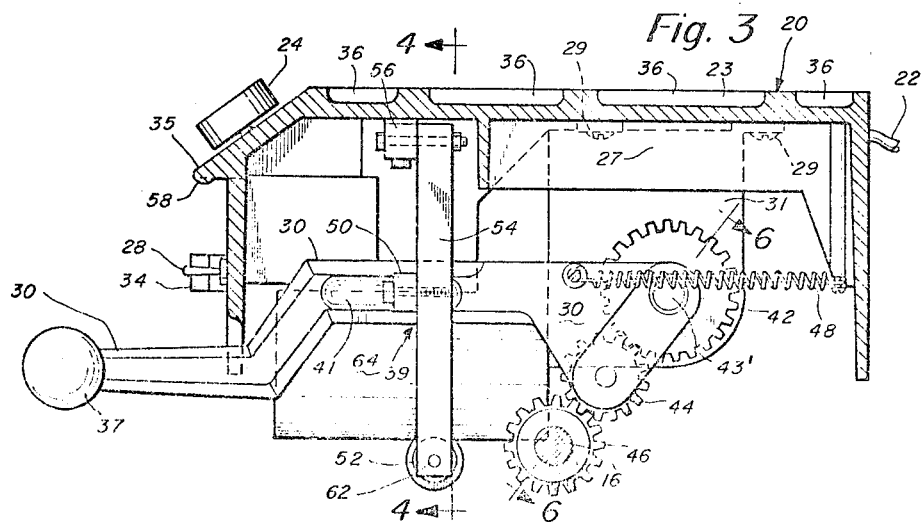
FIG. 3 is a cross-sectional view along section line 3—3 of FIG. 1.

The power feed motor 64 is shown in FIG. 3 secured within the housing 23 by means of a bracket 27 that forms part of the motor casting. The bracket 27 is secured to the lower surface of the housing 23 by means of bolts 29.

Motor 64 through gear box 31 drives the motor gear 42 carried on shaft 43'. The motor gear 42 through an idler gear 44 drives the gear 46 mounted directly on the feed screw 16. When the idler gear 44 is in the position shown in FIG. 3, energization of the motor 64 causes rotation of the feed screw 16, which causes translational motion of the table 12 in a direction determined by the position of directional switch 26 in the power circuit for the motor. As shown in FIG. 1, the motor is energized through a power cord 22. The control circuit of the motor also includes a speed control dial 24 and a power switch 28. The control circuit also includes a jog button 32 and a bayonet type fuse 34 mounted on the control panel 35 along the side of the housing. The control panel 35 also carries the speed dial 24, direction switch 26 and power switch 28. The jog button 32 is a momentary contact switch which enables the operator to run the motor 64 in short spurts so as to "inch" the work to the rotary cutter 18.

As suggested in the introduction, the effect upon the feed screw 16 of rotation of motor 64 is determined by the position of idler gear 44. When the gear is connected to the motor gear 42 and the feed screw gear 46, energization of the motor acts directly upon the feed screw to cause translational motion of the table. However, when the idler gear 44 is moved from the position shown in FIG. 3 so as to disengage the gear 46, energization of the motor has no effect upon the feed screw and therefore on the table 12.

The idler gear 44 is carried on lever 30 which is pivotally mounted on shaft 43' of motor gear 42. In the operative position shown in FIG. 3, lever 30 extends horizontally through a slot in the control panel 35. The lever carries a knob 37 at its free end. The lever 30 is biased to the operative position shown in FIG. 3 by means of the lever control mechanism generally designated 39 in FIGS. 3-5 and 8. As shown in those figures, lever 30 has longitudinally extending notches 41 formed on each side thereof intermediate its ends and within the housing 23. A pair of arms 54 extend vertically within the housing on opposite sides of the lever 30 and are hung on screws 43 which extend through bracket 45 anchored to the underside of the housing by means of screws 47. Each arm 54 carries a roller 50 whose axes are parallel to and disposed on each side of lever 30. An adjusting screw 62 that is threaded into the lower end 49 of arm 54, and extends through a larger opening 51 in the other arm 54'. A spring 60 on the adjusting screw 62 bears against the lower end 51 of arm 54' to urge the rollers 50 toward one another, and the load applied by the spring on the arm 54' may be adjusted by rotating the screw by means of its handle 53. Arms 54 and 54' are pivotally supported on their screws 43 so that pivotal motion away from one another as suggested in FIG. 5 is controlled by the load applied to the arms by means of the spring 60. The adjusting screw 62 also carries a stop 52 in the path of travel of the lever 30 and whose function is described in greater detail below.

In the operative position of lever 30, rollers 50 are disposed in the notches 41 of the lever as shown in FIG. 4. However, under sufficient force, the lever may be pivoted to either of the two positions shown in full and phantom lines in FIG. 8 so as to move the idler gear 44 out of engagement with the feed screw gear 46 by causing the lever to move so that the notches 41 are disengaged by rollers 50. With sufficient force applied to the lever 30, it may move up or down and thereby spread the arms 54 as suggested in FIG. 5 so that the lever forces its way from between the rollers and is left to the influence of spring 48 which biases the lever to either of the two positions shown in FIG. 8. It will be appreciated that the swing of lever 30 is limited by the stop 52 when the lever is driven downwardly from between the rollers 50 and is limited upwardly by the top of slot.

When the machine is not in use, the lever 30 would ordinarily be placed in the position shown in full lines in FIG. 8 that is, in the elevated position where the lever is held by spring 48. This position of the lever 30 disengages idler gear 44 from the feed screw gear 46, and any accidental energization of motor 64 will not cause translational motion to be imparted to table 12. When the machine is to be used, the operator manually drives the lever 30 to the so-called horizontal position or operative position shown in FIG. 3 which places the idler gear 44 in registration with the drive screw gear 46. When the machine is being operated, in the event substantial resistance to travel of the table 12 is encountered as for example by stop 14 engaging shoulder 15, it is evident that screw 16 will no longer be able to turn, and therefore its gear 46 will also resist further rotation. Consequently, continued rotation of motor 64 will cause gear 42 to rotate, which will drive the idler gear 44 out of gear 46 as suggested in FIG. 8. The direction in which idler gear 44 moves away from gear 46 will be determined by the direction of rotation of gear 42. Thereafter, if the operator wishes to continue operation of the machine, he may throw reversing switch 26 to change the direction of rotation of motor 64 and/or rotate crank 21 a few turns so as to move stop 14 away from the flange 15. To reinitiate operation, the operator need then only jam the lever 30 back to the operative position as shown in FIG. 3 and the system will be operable. Thus, the device provides protection against burning out of the motor by removing the immovable load of the motor which would cause the motor to overheat and ultimately blow fuse 34.

From the foregoing description those skilled in the art will appreciate that the improvement of the present invention avoids the limitation inherent in the milling machine attachment of King, supra. Essentially stalling of the motor is avoided, as is overheating and the blowing of the fuse. Rather, in the present invention, the motor is allowed to continue to rotate after the table stops as the idler gear disengages the feed screw gear.

From the foregoing description those skilled in the art will appreciate that numerous modifications may be made of this invention without departing from its spirit. Therefore, I do not intend to limit the scope of this invention to the single embodiment illustrated and described. Rather, it is my intention that the scope of this invention be determined by the apended claims and their equivalents.

I claim:

1. Power feed apparatus adapted for mounting on a milling machine having a movable table, means including a feed screw for moving said table parallel to the axis of said screw, and a drive gear mounted on one end of said feed screw, said apparatus comprising:
    a housing adapted for mounting on said movable milling machine table,
    a motor supported by said housing,
    an output gear disposed in the housing and driven by said motor,
    connecting means for interruptibly connecting said output gear and said drive gear so as to rotate said feed screw, said connecting means comprising an idler gear rotatably mounted on a lever pivotally attached to and extending out of said housing, said lever being movable between a first raised position wherein said idler gear is disengaged from said feed screw drive gear, a second middle position wherein said idler gear is engaged with said feed screw drive gear, and a third lowered position wherein said idler gear is disengaged from said feed screw drive gear, and
    a pressure lock mounted on said housing so as to engage and detain said lever when it is in said second position, said pressure lock automatically releasing said lever, enabling it to move from the second position to either the first or third position when the output gear rotates and the drive gear is stationary.

2. The apparatus of claim 1, wherein said pressure lock comprises two arms pivotally depending from said housing, one on either side of said lever,
    and roller means mounted on the arms for releasably engaging said lever.

3. The apparatus of claim 2, wherein said lever has a pair of notches adapted to engage said roller means.

4. The apparatus of claim 3, wherein adjusting means is connected to the arms for varying the force with which the roller means engages the notches.

5. The apparatus of claim 4, wherein said lever is pivotally supported on an axis coincident with the axis of the output gear of the motor.

6. The apparatus of claim 1, wherein said lever maintains engagement between said idler gear and the motor output gear in all three positions.

* * * * *